United States Patent
Lev et al.

(10) Patent No.: US 9,292,165 B2
(45) Date of Patent: Mar. 22, 2016

(54) MULTIPLE-MODE INTERFACE FOR SPATIAL INPUT DEVICES

(71) Applicant: CONDUIT LTD., Ness Ziona (IL)

(72) Inventors: Eitan Lev, Even Yehuda (IL); Ronen Shilo, Gedera (IL)

(73) Assignee: CONDUIT LTD, Ness Ziona (IL)

(*) Notice: Subject to any disclaimer, the term of this patent is extended or adjusted under 35 U.S.C. 154(b) by 409 days.

(21) Appl. No.: 14/050,149

(22) Filed: Oct. 9, 2013

(65) Prior Publication Data
US 2015/0100906 A1    Apr. 9, 2015

(51) Int. Cl.
*G06F 3/0484* (2013.01)
*G06F 3/0488* (2013.01)
*G06F 3/0481* (2013.01)
*G06F 3/0346* (2013.01)

(52) U.S. Cl.
CPC .......... *G06F 3/04815* (2013.01); *G06F 3/0346* (2013.01)

(58) Field of Classification Search
CPC combination set(s) only.
See application file for complete search history.

(56) References Cited

U.S. PATENT DOCUMENTS

| | | | |
|---|---|---|---|
| 6,844,871 B1 * | 1/2005 | Hinckley | G06F 3/0395 345/163 |
| 2012/0151339 A1 * | 6/2012 | Zhang | G06F 3/016 715/702 |

* cited by examiner

*Primary Examiner* — Xiomar L Bautista
(74) *Attorney, Agent, or Firm* — Tutunjian & Bitetto, P.C.

(57) ABSTRACT

Systems and methods for providing presentations of digital graphical objects which are optimized at the time of presentation according to the characteristics of the user's input device. A web page has the ability to present a graphical object in one of two alternative representations: The first representation is displayed on the screen of the user's computer when there is no control signal from an input device communicating with the computer, or if an input device communicating with the computer provides fewer than three degrees of freedom simultaneously for manipulating the graphical object. The second representation is displayed on the screen of the user's computer when there is an input device communicating with the computer which simultaneously provides three or more degrees of freedom for manipulating the graphical object.

21 Claims, 4 Drawing Sheets

MULTIPLE-MODE INTERFACE FOR SPATIAL INPUT DEVICES

FIELD

The present invention relates to visual manipulation of digital graphical objects, and, in particular, to manipulation of digital graphic objects in the display of web pages by a variety of input devices.

BACKGROUND

Graphical information presented to users on displays of Internet browsing devices includes, inter alia: still pictures; motion pictures; two-dimensional projections of three-dimensional objects; and representations thereof. Some web pages allow the user to visually manipulate graphical objects on the display device in two or three dimensions via appropriate input devices.

A measure of the versatility of manipulation of a graphical object presented on a web page is the number of degrees of freedom (DOF) permitted by the web page for that graphical object.

Degrees of Freedom

The concepts related to degrees of freedom for graphical objects on a web page screen borrow from concepts related to degrees of freedom for physical objects, such as in the case of rigid body motion. Graphical objects are virtual objects, and are not subject to the same physical laws that apply to real objects. Even so, however, graphical objects are still subject to certain mathematical-geometrical relationships that apply to the manipulation of real objects. It is thus illustrative to consider some examples of positional manipulation of real objects.

A single degree of freedom can be a translation of an object along a single axis, or a rotation of the object about a single axis. Different degrees of freedom may be combined in certain ways to obtain multiple degrees of freedom.

In the definitions herein relating to degrees of freedom of a digital graphical object, the frame of reference for translation and rotation is understood to be the immediate presentation environment of the digital graphical object, regardless of how the presentation environment is moved or oriented. In particular, some computer operating systems provide windowing capabilities whereby the presentation of a digital graphical object is within a "window" which may be independently moved with respect to the physical boundaries of the computer's display device. In addition, some computer operating systems provide a full-screen display that can be rotated by the operating system in 90-degree increments to accommodate different orientations of the physical display device (e.g., "portrait" or "landscape" orientations). It is expressly understood that such translations and/or rotations of an operating system window and/or full-screen display alter not only the display of a digital graphical object within the window or full-screen display, but also the immediate presentation environment thereof, and consequently do not effect any change in the degrees of freedom of the digital graphical object as defined herein. In the case of such windows or full-screen displays, the degrees of freedom of a digital graphical object are always taken with respect to the window and/or the full-screen display regardless of how the window and/or full-screen display is translated and/or rotated by the operating system.

In three-dimensional Euclidean space there are three completely independent translational degrees of freedom, commonly represented in Cartesian coordinates as x, y, and z. The expression "completely independent" denotes that no change in any one of the degrees of freedom can be brought about by any combination of changes in the others. For example, no combination of changes in the x- and y-positions of an object by themselves alone can bring about a change in the z-position of the object. This is also the case in other coordinate systems, such as cylindrical coordinates (r, z, and $\theta$) and spherical coordinates (r, $\theta$, and $\phi$).

In three-dimensional Euclidean space there are also three rotational degrees of freedom. Coordinate systems for rotation are usually selected to suit the physics of the motion of the object under consideration. For example, rotational coordinates for gyroscopic motion are usually the so-called "Euler rotation" variables (intrinsic rotation or spin; precession; and nutation), while rotational coordinates for vehicular motion are usually chosen relative to the Cartesian axes of the vehicle frame (roll; pitch; and yaw).

Unlike translational degrees of freedom, however, the three rotational degrees of freedom are not completely independent. That is, a change in one particular degree of rotational freedom can be brought about by a combination of changes in the other two degrees of freedom.

The above point is illustrated by the case of rigid body motion of vehicles. A four-wheeled vehicle, for example, has a single degree of rotational freedom—yaw, controlled by the steering system—for making turns. In contrast, a fixed-wing aircraft in flight has all three degrees of rotational freedom, but in most cases yaw is aerodynamically undesirable in fixed-wing aircraft (sometimes referred to as "adverse yaw"). Thus, direct control over yaw in fixed-wing aircraft is usually limited, and is used principally to reduce or eliminate yaw. In order for a fixed-wing aircraft to make a turn, therefore, the yaw required for making the turn is made indirectly, via a combination of a roll and a nose-up pitch (this combination is referred to as a "bank"), which is later followed by an opposite roll to come out of the bank (usually referred to as a "rollout"). That is, a yaw may be brought about by a sequential combination of a roll, a pitch, and a negative roll, thereby illustrating that the three degrees of rotational freedom are not completely independent. This is a mathematical-geometrical property of rotations that applies not only to rotations of real objects (such as fixed-wing aircraft), but also to graphical objects displayed on a screen.

Available User Input Devices

Some graphical objects that represent rigid bodies displayed on a screen can be manipulated by the user, with one or more degrees of freedom. However, the ability of the user to perform the manipulations is governed in large measure on the capabilities of the input device available to the user.

Graphical Object Display

Graphical objects are displayed by a variety of interactive display-enabled devices ranging from television sets (and similar devices) to personal computers to smartphones (and similar devices). Display devices include screens as well as projection systems for providing visual displays. Not all display-enabled devices have the same user input capabilities for manipulating the graphical objects on the display device thereof.

Interactive television, for example, typically offers minimal user manipulation of graphical objects. The user might be limited to the cursor capabilities of a typical remote control device (left/right/up/down/enter).

For digital graphical objects displayed on a screen, translational degrees of freedom are limited to translation in the display screen coordinates (i.e., in the plane of the screen). Display screen coordinates are typically denoted as x (the "horizontal" screen axis) and y (the "vertical" screen axis).

The axis perpendicular to the plane of the display screen (also known as "normal to the screen") is typically denoted as the z axis. In an isometric projection of the digital graphical object, no change in size results from a translation along the z axis. A change in size results, however, from a translation along the z axis in a perspective projection. According to the present disclosure, visual manipulation of a digital graphical object in an axis perpendicular to the display screen is considered to be a magnification/demagnification (or "zoom") of the digital graphical object and not a translation of the digital graphical object. That is, for purposes of the present description and claims, only the x and y axes (in the plane of the display screen) are axes of translation for visually-manipulating a digital graphical object, and the z axis (perpendicular to the plane of the display screen) is not included as a degree of translational freedom for visual manipulation of the digital graphical object. The z-axis, however, remains as an axis of rotation and still offers a degree of rotational freedom for visually manipulating a digital graphical object.

For computers, common input devices used to manipulate graphical objects include: a mouse; a trackball; a touchpad; and a joystick. Such devices inherently offer two degrees of freedom for user control. Even with only two degrees of freedom, however, such input devices allow users to manipulate three-dimensional bodies in more than two degrees of freedom by switching control channels, for example by redirecting a translational degree of freedom of the input device to control a rotation of the graphical object.

Smartphones and computers with touchscreens (and some computers with touchpads) have expanded capabilities. Even with only two inherent degrees of freedom, however, such devices can manipulate a three-dimensional graphical object in more than two degrees of freedom, by allowing the user to switch the device's inherent two degrees of freedom to control different degrees of freedom in the display of the graphical object. For example, a touchscreen inherently has x and y degrees of freedom, so that a user can manipulate a graphical object in x and y position on the screen by dragging it with a finger from one x-y position to another. Typically, however, the user can also employ two-fingered gestures to manipulate the object's rotational position around the z-axis (e.g., with a two-finger "twirl" gesture). Some trackballs and mice employ "scroll wheels", as well as associated buttons, to enable similar manipulations.

The accelerometers and gyroscopic sensors ("gyros") included in smartphones and similar devices, and numerous software applications ("apps") that feature computer control via such devices, offer widespread input devices that have more than two inherent degrees of freedom, and some computer applications already use smartphones as control devices for manipulating graphical three-dimensional objects having more than two degrees of freedom.

Applications Offering Manipulation of Graphical Objects

Computer-Aided Design (CAD), gaming, simulations, and virtual-reality web pages benefit from and typically utilize input devices that have more than two degrees of freedom, thereby allowing more intuitive control in manipulating three-dimensional graphical objects. For example, being able to freely manipulate an object being designed or constructed for viewing purposes is important during the design and evaluation process.

Some web pages involve displaying graphical objects for user inspection and examination, such as products available for purchase. In such applications, rotational degrees of freedom are important to allow users to view the objects from different sides and angles.

For virtual reality purposes, the rotations and translations may be those of the viewer, rather than those of the object being viewed, such as in a walkthrough of a building in the planning stage, or an interactive viewing of a house for sale by a prospective purchaser.

Gaming typically combines all possible manipulations, including aspects of object viewing and inspection and virtual reality settings. Both games and simulators often require specialized input devices with specific characteristics. For example, flight simulators are often employed in conjunction with input devices that mimic the controls of actual aircraft. As another example, for shooting simulators and advanced gaming, users often employ input devices which resemble actual or conceptualized weapons.

FIG. 1A illustrates a computer system configuration for displaying a digital graphical object 113 on a display device 107 within a window 109, with at most two degrees of freedom, as indicated by a translation symbol 111 representing two degrees of translational freedom, x and y. A user has a computer 101 having an input keyboard 103 and a mouse 105 as a spatial input device to control the display of digital graphical object 113 on display device 107. In this example, mouse 105 outputs control signals for controlling up to two degrees of translational freedom, such as the x and y positions of digital graphical object 113 on display device 107. In this example, a zoom view 115 can be manipulated in the x and y positions via mouse 105.

FIG. 1B illustrates a computer system configuration for displaying a digital graphical object 133 on display device 107 within window 109, with at least three degrees of freedom, as indicated by translation symbol 111 along with a roll symbol 119 and a yaw symbol 121, each of which represents an additional degree of rotational freedom. In this example, then, digital graphical object 133 represents an object existing in three-dimensional space and having four degrees of freedom: x and y translational freedom, and roll and yaw rotational freedom. In this example, the user has a smartphone 125 as a spatial input device, having a screen 127. As noted above, smartphone 125 is equipped with sensors such as accelerometers and gyros, which enable determination of orientation and changes in position as a result of user manipulation in translation and rotational orientation, as shown in degree of freedom symbols 111, 119, and 121. A subsequent view 135 shows digital graphical object 133 manipulated by the user via a roll operation per rotation symbol 119.

Degree of freedom symbols 111, 119, and 121 are herein also referred to as "manipulation indicia".

It is noted that visual degree of freedom indicators 111, 119, and 121 shown in the figures may be omitted from display in actual use.

Manipulation of Graphical Objects in Web Pages

Currently, website designers decide at the beginning of the design process whether a graphical object presented to the user will be manipulatable or not, and if it is manipulatable, which of degree(s) of freedom can be exercised by the user. In some cases, a sophisticated web page allowing higher degrees of freedom, may require an input device of corresponding sophistication.

Thus, a website designer setting up a web page with a manipulatable graphical object display anticipates in advance what sort of input devices may be available in the user environment for manipulating the graphical object. In general, however, the website designer cannot always assume that the user has an input device capable of more than two degrees of freedom. In such cases, the designer may need to avoid using graphical objects that are suited for convenient manipulation in more than two degrees of freedom. This restriction limits the use of the web page.

It is therefore desirable to have methods and systems which overcome the restriction discussed above. This goal is met by embodiments of the present invention.

SUMMARY

Embodiments of the present invention provide systems and methods for allowing website designers and third-party content providers to offer, to a user, presentations of digital graphical objects which are optimized at the time of presentation according to the characteristics of the user's input device.

According to certain embodiments of the present invention a web page has the ability to present a graphical object in one of two alternative representations:

The first representation is displayed on the screen of the user's computer when there is no control signal from an input device communicating with the computer, or if an input device communicating with the computer fewer than three degrees of freedom for manipulating the graphical object.

The second representation is displayed on the screen of the user's computer when there is an input device communicating with the computer which simultaneously controls three or more degrees of freedom for manipulating the graphical object.

According to further embodiments of the present invention, an input device includes one or more accelerometers for detecting user translational manipulation of the input device along various axes relative to the orientation of the accelerometer(s). In other embodiments, gyroscopic sensors of the input device can be used to detect rotational manipulation of the device by the user. In related embodiments, the detected translational and/or rotational manipulations of the device are converted into control signals for corresponding manipulations of the graphical object displayed by the web page on the computer screen.

In another embodiment of the present invention, an input device as described herein is a smartphone or similar apparatus equipped with the appropriate accelerometer(s) and gyroscopic sensor(s).

DEFINITIONS

The term "web page" herein denotes a document accessed over the World Wide Web, which displays on a screen via a web browser.

The term "website" herein denotes a set of related web pages served from a single web domain over the Internet.

The term "graphical object" herein denotes an element of non-textual visual content displayed to a user on a computer screen. Non-limiting examples of graphical objects include: images of real physical objects; images of conceptualized physical objects; drawings, computer-generated images, and similar visual renderings of real physical objects and conceptualized physical objects. Uses of graphical objects include, but are not limited to: informational purposes; aesthetic purposes; recreational and entertainment purposes; and demonstrative purposes.

The term "still picture" herein denotes a graphical element with a fixed appearance, such as a photograph, drawing, painting, or static computer-generated image.

The term "motion picture" herein denotes a graphical element with a dynamic appearance having changes over time, such as a pre-recorded video or dynamic computer animation with a predetermined non-alterable sequence of changes. A given motion picture, for example, has no provisions for receiving input or parameters that would affect the dynamic appearance.

The term "three-dimensional image" herein denotes a two-dimensional digital projection of a three-dimensional graphical object that can be manipulated on the screen with at least three degrees of freedom, at least one of which includes a rotation axis that is not perpendicular to the screen.

The term "input device" herein denotes a device communicating with a computer, but physically separate therefrom, which is employed by a user for manipulating the position, orientation, or shape of graphical objects displayed on the computer's screen. According to certain embodiments of the present invention, an input device communicates with the computer via a wired connection. According to other embodiments, an input device communicates with the computer via a wireless connection. In still other embodiments, a computer has one or more built-in input devices, a non-limiting example of which is a portable computer with a built-in touchpad. The phrase "connected to a computer" herein denotes that an input device is electrically interfaced to the computer for providing signals thereto.

The term "computer" herein denotes a data processing apparatus for executing a set of executable commands and having a processor, memory storage, and a visual display device capable of displaying graphical objects. The display device can be a separate physical device connected to the computer, such as a flat-screen display monitor or a projector which projects an image onto separate surface. Examples of computers include, but are not limited to: a personal computer having a display monitor; a personal computer with a built-in display screen; an interactive television system with an Internet connection and an Internet browsing capability; a workstation; a server; a gateway; a router; a multiplexer, a demultiplexer; a modulator, a demodulator; a switch; a processor; a controller; and a digital appliance.

The terms "visually manipulatable" and "manipulatable" herein denote that the display of a given digital graphical object on a display device may be manipulated by a user in at least one degree of freedom, as defined hereinabove. The term "non-manipulatable" herein denotes that the display of a given digital graphical object on a display device cannot be manipulated in at least one degree of freedom by the user.

The term "visually rotationally manipulatable" herein denotes that the display of a given digital graphical object on a display device may be manipulated by a user in at least one degree of rotational freedom, i.e., visually rotatable around at least one axis of rotation. According to various embodiments of the present invention, a digital graphical object may be visually rotationally manipulatable in no more than one degree of rotational freedom; in a non-limiting example, a digital graphical object may be visually rotatable only around an axis perpendicular to the plane of the display screen. According to other embodiments, a digital graphical object may be visually rotationally manipulatable in at least two degrees of rotational freedom; in a non-limiting example, a digital graphical object may be visually rotatable around both an axis perpendicular to the plane of the display screen and also around an axis lying in the plane of the display screen. It is emphasized that restrictions on rotational degrees of freedom are independent from those on translational degrees of freedom. That is, the number of degrees of rotational freedom of a digital graphical object is independent of the number of degrees of translational freedom of the digital graphical object.

According to various embodiments of the present invention, a key property of 3D digital graphical objects is that they be visually rotationally manipulatable around at least one axis of rotation that lies in the plane of the display screen. In this manner, the user can project different views of the digital graphical object onto the display screen for viewing additional information about the object. In a related embodiment, a 3D digital graphical object is visually rotationally manipulatable in two different axes of rotation lying in the plane of the display screen; a non-limiting example has an axis of rotation parallel to the x-axis of the display screen and a separate axis of rotation parallel to the y-axis of the display screen. This arrangement allows the user to view the 3D digital graphical object from any direction to obtain complete visual information about the external surface of the object. In contrast, rotation about an axis of rotation perpendicular to the display screen (parallel to the z-axis) does not add to the visual information presented to the user.

According to certain embodiments of the invention, an input device can be responsive to physical rotation by the user, such that when the user physically rotates the at least one input device, the at least one input device sends control signals corresponding to the physical rotation. In a non-limiting example, an ordinary mouse pointing device typically is not responsive to physical rotation by the user; even though a software application could interpret linear motion of the mouse as a control signal to perform a visual rotational manipulation, the mouse device itself is not responsive to physical rotation. In another non-limiting example, a smartphone used as an input device typically is responsive to physical rotation, on account of the gyroscopic sensors in the smartphone.

According to various embodiments, an input device can have from one or more channels of continuous data sent simultaneously, allowing the user to manipulate a graphical object with one or more degrees of freedom simultaneously. An input device is said to provide "control signals for N degrees of freedom", when it provides N independent channels of continuous input position data to a computer.

Therefore, according to an embodiment of the present invention there is provided a method for manipulating a digital graphical object on a display device of a computer, the method including: (a) storing, in a storage device of the computer, a first data representation of the digital graphical object, the first data representation being visually rotationally manipulatable in no more than one rotational degree of freedom; (b) storing, in a storage device of the computer, a second data representation of the digital graphical object, the second data representation being visually rotationally manipulatable in at least two rotational degrees of freedom; (c) detecting, by a processor of the computer, at least one input device connected to the computer; and (1) if the at least one input device includes an input device for simultaneously controlling at least two rotational degrees of freedom, then presenting the digital graphical object on the display device according to the second data representation, visually rotationally manipulatable in the at least two rotational degrees of freedom in accordance with control signals received from the at least one input device; and (2) if the at least one input device includes no input device for simultaneously controlling at least two rotational degrees of freedom, then presenting the digital graphical object on the display device according to the first data representation, visually rotationally manipulatable in no more than one rotational degrees of freedom in accordance with control signals received from the at least one input device.

In addition, according to another embodiment of the present invention there is provided a method of manipulating, by a browser, a digital graphical object on a display device of a computer, the method including: (a) receiving a command from a user, the command identifying a web page; (b) downloading from the web page a first data representation of the digital graphical object, the first data representation being visually rotationally manipulatable in no more than one rotational degree of freedom; (c) downloading a second data representation of the digital graphical object, the second data representation being visually rotationally manipulatable in at least two rotational degrees of freedom; (d) detecting, by a processor of the computer, at least one input device connected to the computer; and (1) if the at least one input device includes an input device for simultaneously controlling at least two rotational degrees of freedom, then presenting the digital graphical object on the display device according to the second data representation, visually rotationally manipulatable in the at least two rotational degrees of freedom in accordance with control signals received from the at least one input device; and (2) if the at least one input device includes no input device for simultaneously controlling at least two rotational degrees of freedom, then presenting the digital graphical object on the display device according to the first data representation, visually rotationally manipulatable in no more than one rotational degrees of freedom in accordance with control signals received from the at least one input device.

Moreover, according to still another embodiment of the present invention there is provided a computer system for presenting a digital graphical object to a user, the system including: (a) a storage device, for storing: (1) a first data representation of the digital graphical object, the first data representation being visually rotationally manipulatable in no more than one rotational degree of freedom; and (2) a second data representation of the digital graphical object, the second data representation being visually rotationally manipulatable in at least two rotational degrees of freedom; (b) a display device, for presenting the digital graphical object to a user; and (c) a processor, for: (3) detecting at least one input device connected to the computer; and (i) if the at least one input device includes an input device for simultaneously controlling at least two rotational degrees of freedom, then presenting the digital graphical object on the display device according to the second data representation, visually rotationally manipulatable in the at least two rotational degrees of freedom in accordance with control signals received from the at least one input device; and (ii) if the at least one input device includes no input device for simultaneously controlling at least two rotational degrees of freedom, then presenting the digital graphical object on the display device according to the first data representation, visually rotationally manipulatable in no more than one rotational degrees of freedom in accordance with control signals received from the at least one input device.

Furthermore, according to yet another embodiment of the present invention there is provided a computer product for manipulating a digital graphical object on a display device of a computer, the product including a tangible non-transitory storage medium containing a set of executable commands, such that when the executable commands of the computer product are executed by the computer, the computer product causes a processor of the computer to perform: (a) storing, in a storage device of the computer, a first data representation of the digital graphical object, the first data representation being visually rotationally manipulatable in no more than one rotational degree of freedom; (b) storing, in a storage device of the computer, a second data representation of the digital graphical object, the second data representation being visually rotationally manipulatable in at least two rotational degrees of freedom; (c) detecting, by the processor, at least one input device connected to the computer; and (1) if the at least one input device includes an input device for simultaneously controlling at least two rotational degrees of freedom, then presenting the digital graphical object on the display device according to the second data representation, visually rotationally manipulatable in the at least two rotational degrees of freedom in accordance with control signals received from the at least one input device; and (2) if the at least one input device includes no input device for simultaneously controlling at least two rotational degrees of freedom, then presenting the digital graphical object on the display device according to the first data representation, visually rotationally manipulatable in no more than one rotational degrees of freedom in accordance with control signals received from the at least one input device.

BRIEF DESCRIPTION OF THE DRAWINGS

The present invention will be more fully understood from the following detailed description of the embodiments thereof, taken together with the drawings in which.

DETAILED DESCRIPTION

The principles and operation of a system and method according to embodiments of the present invention may be understood with reference to the drawings and the accompanying description.

Figures 1A, 1B:
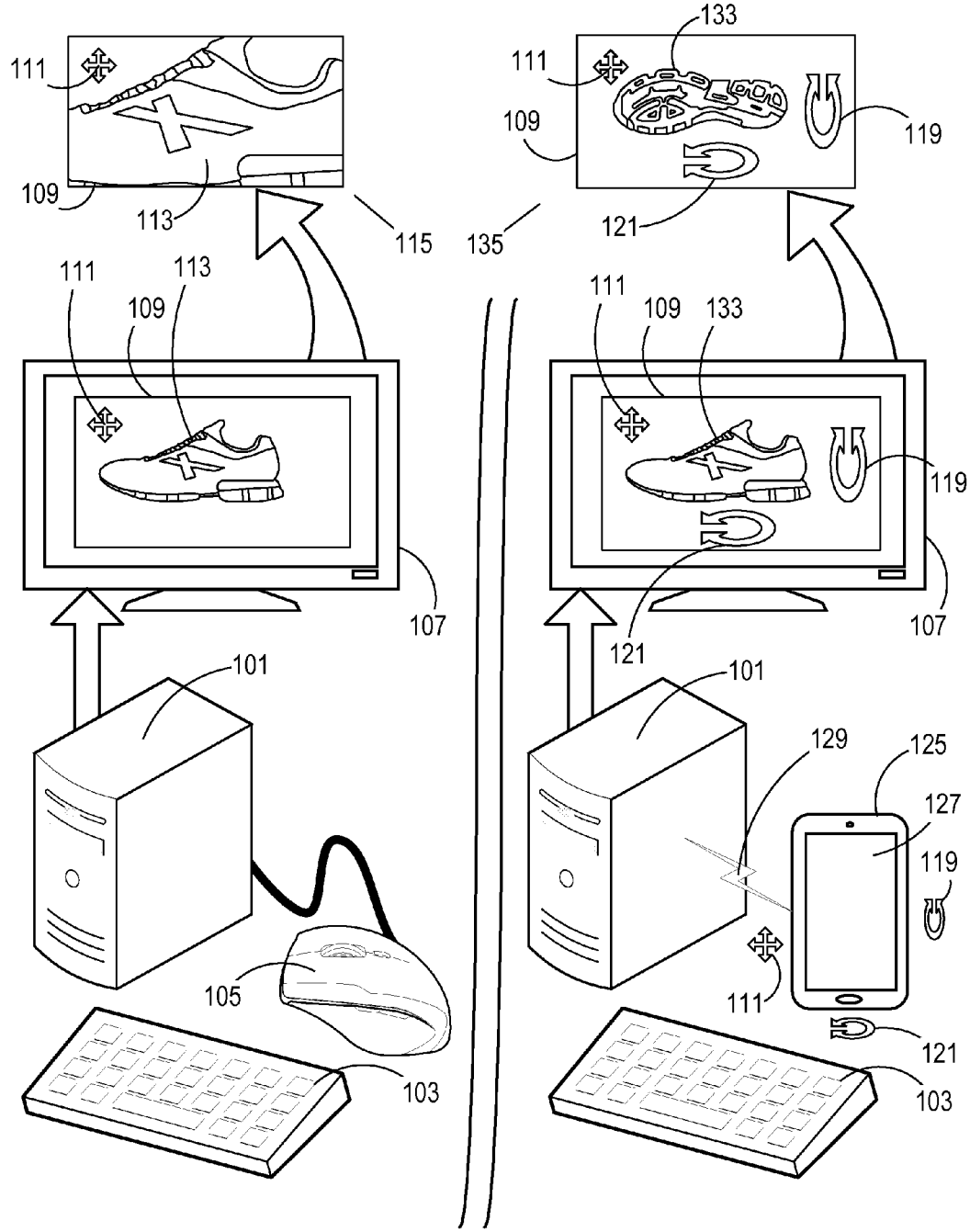
FIG. 1A illustrates a computer system configuration for displaying a digital graphical object with at most two degrees of freedom.
FIG. 1B illustrates a computer system configuration for displaying a digital graphical object with at least three degrees of freedom.
Figure 2:
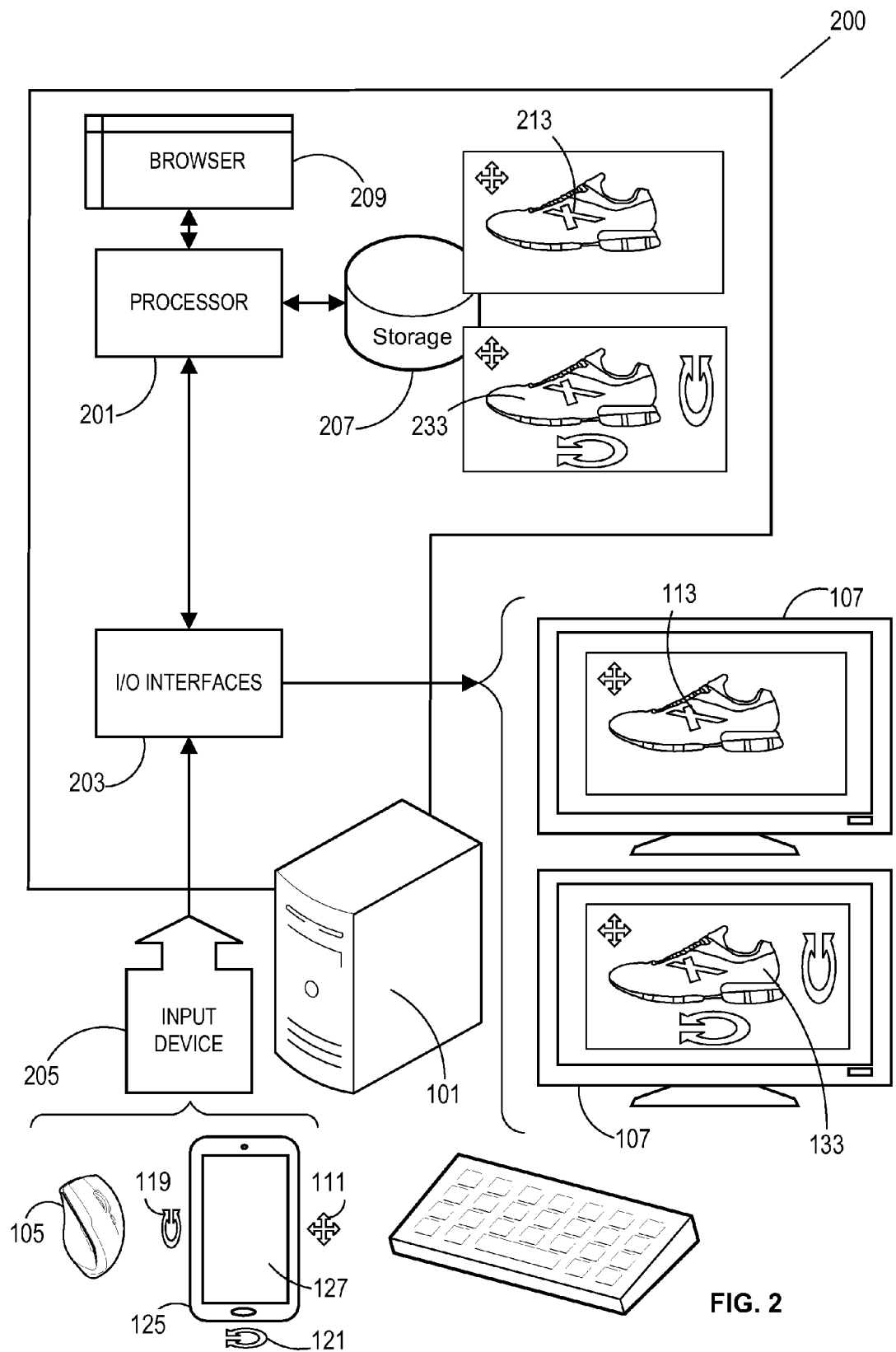
FIG. 2 illustrates a computer system according to an embodiment of the present invention for responsively presenting, to a user, a digital graphical object with either at most two degrees of freedom or at least three degrees of freedom.

FIG. 2 illustrates a computer system 200 according to an embodiment of the present invention for responsively presenting, to a user, either digital graphical object 113 having at most two degrees of freedom of manipulation or digital graphical object 133 having at least three degrees of freedom of manipulation, depending on the specific capabilities of an input device 205. According to various embodiments of the invention, both digital graphical object 113 and digital graphical object 133 graphically represent the same conceptual subject to the user, and differ essentially only in the number and/or nature of the degrees of freedom in which they can be graphically rendered. In some embodiments the conceptual subject is a physical object or set of physical objects that can be viewed by the user; in other embodiments, the conceptual subject is a virtual object or set of virtual objects; in further embodiments, the conceptual subject is a design or artistic creation which does not necessarily have a physical counterpart.

Computer system 200 includes a processor 201 connected to a data storage unit 207 in which a digital graphical object data representation 213 and a digital graphical object data representation 233 are stored, which correspond respectively to digital graphical object 113 and digital graphical object 133 as displayed. That is, data representation 213 can be manipulated in no more than two degrees of freedom, whereas data representation 233 represents a three-dimensional object that can be manipulated in at least three degrees of freedom in three-dimensional space. In an embodiment of the present invention, data representation 233 can be manipulated in at least two rotational degrees of freedom. In a non-limiting example, data representation 213 can be manipulated translationally in x and y position, whereas data representation 233 can be manipulated both translationally in x and y position and also rotationally in roll and yaw orientations.

Input/Output interfaces 203 provide external interfaces to processor 201, and a browser application 209 provides non-transitory machine-readable executable instructions to processor 201 for performing methods as disclosed herein, for presenting, to a user, a display of a digital graphical object according to the capabilities of the input device attached to the computer. In an embodiment of the invention, browser application 209 contains the non-transitory executable instructions as native code programmed within browser application 209. In another embodiment of the invention, browser application 209 contains the non-transitory executable instructions in the form of an "add-in" capability (also known as an "add-on" or "plug-in"). In a related embodiment of the present invention, browser 209 performs the manipulation of digital graphical objects 113 and 133.

If input device 205 offers no more than two degrees of freedom (such as mouse 105), then system 200 provides a display of digital graphical object 113, as shown, which can be manipulated in no more than two degrees of freedom. If, however, input device 205 offers at least three degrees of freedom (such as smartphone 125), then system 200 provides a display of digital graphical object 133, as shown, which can be manipulated in at least three degrees of freedom.

In a related embodiment of the present invention, smartphone 125 displays manipulation indicia 111, 119, and 121 on smartphone screen 127 to notify the user that smartphone 125 can be used to manipulate digital graphical object 133 in the indicated degrees of freedom. In another related embodiment, manipulation indicia 111, 119, and 121 on smartphone screen 127 are soft buttons which the user can tap and/or swipe to effect the respective manipulations of digital graphical object 133.

Figure 3A:
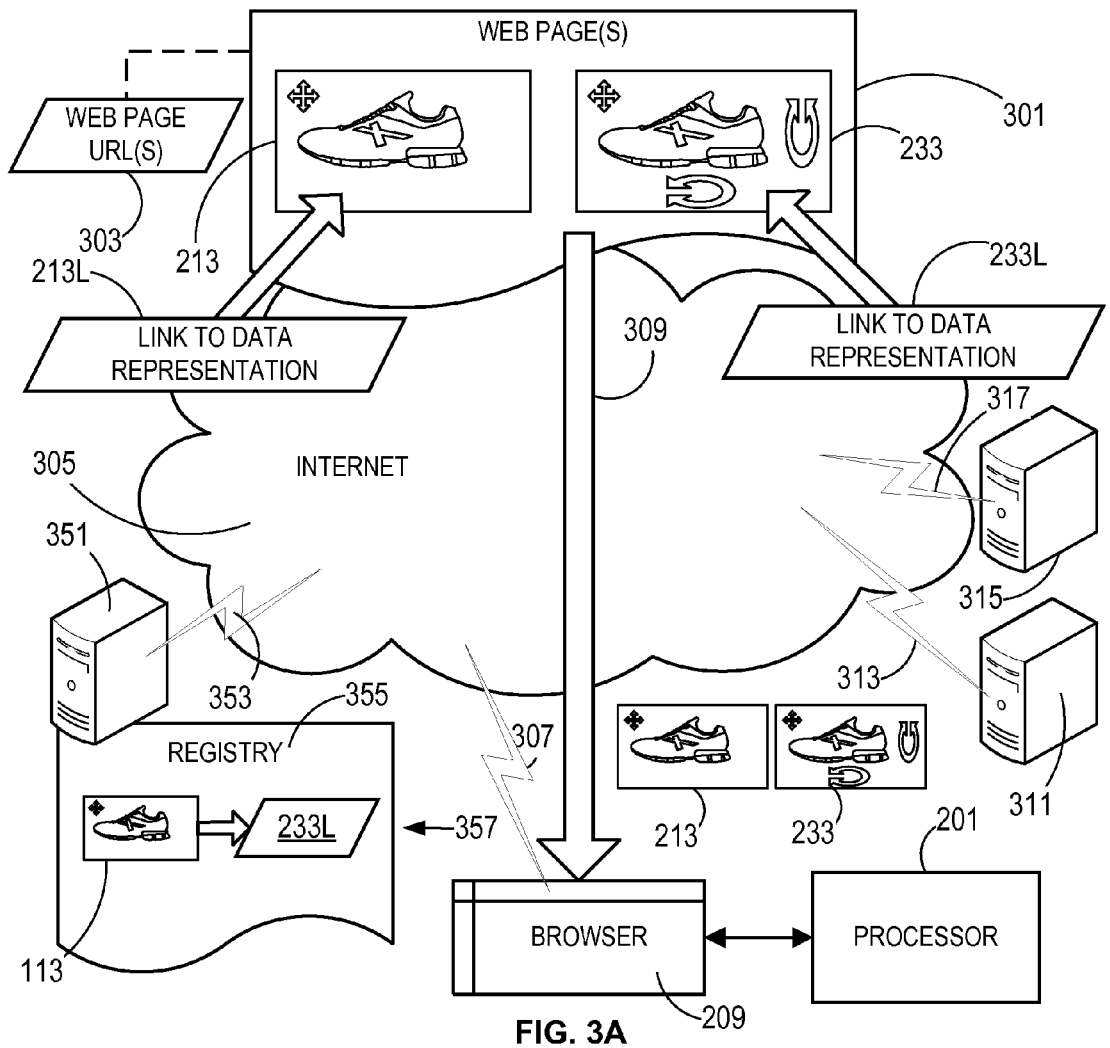
FIG. 3A illustrates a network configuration according to an embodiment of the present invention for selectively providing multiple data representations of a digital graphical object having different numbers of degrees of freedom.

FIG. 3A illustrates a network configuration according to an embodiment of the present invention for selectively providing multiple data representations of a digital graphical object having different numbers of degrees of freedom. One or more web page(s) 301 having corresponding URL(s) 303 on Internet 305 provides digital graphical object data representation 213 as well as digital graphical object data representation 233. In a related embodiment, data representation 213 and data representation 233 are on different web pages; in a non-limiting example, data representation 233 is on a service web page, which is different from web page 301. In another related embodiment, data representation 213 and data representation 233 are hosted by different websites. In yet a further related embodiment, representation 213 and data representation 233 are hosted by different servers, such as servers 311 and 315. A link 213L references data representation 213 and a link 233L references data representation 233. By means of a connection 307, browser 209 connects to Internet 305 and receives data representation 213 and data representation 233 via a virtual circuit path 309. In a related embodiment, links such as link 213L and link 233L reference other web pages on the Internet. Servers 311 and 315 connect to Internet 305 via connections 313 and 317 respectively, and provide a physical presence for web pages, such as web page 301. In an embodiment of the present invention, server 311 provides one or more web page(s) for data representation 213 as well as data representation 233. In another embodiment, server 311 is a website server that provides a web page for data representation 213 having no more than two degrees of freedom for user manipulation, and server 315 is a service server that provides a different web page for data representation 233 having at least three degrees of freedom for user manipulation. In a related embodiment, browser 209 contains a link directly to service server 315, so that website server 311 does not need to provide a link to service server 315. In this embodiment, browser 209 makes the decision whether to use data representation 213 from website server 311 or data representation 233 from service server 315, based on the characteristics of input device 205 (FIG. 2).

An embodiment of the present invention provides, to a third party, the capability of offering a 3D version of a digital graphical object that supplements a 2D version of the digital graphical object which is offered by one of the principal parties. In a non-limiting example, a retailer hosts a customer website on server 311, which offers 2D data representation 213 for a digital graphical object 113 (FIG. 2) depicting an item for sale (such as a running shoe, as illustrated). Independent of the retailer (and without requiring the retailer's participation and/or cooperation and/or knowledge), an advertising agency retained by a manufacturer of the item establishes service server 315 to offer 3D data representation 233 to enhance the customer's experience when browsing the retailer's website. In a related embodiment, browser 209 consults a registry database 355 hosted on a registry server 351 (via a connection 353) to determine if a 3D data representation corresponding to digital graphical object 113 is available. In this example, registry database 355 contains a record 357 indicating that digital graphical object 113 has a 3D data representation accessible via link 233L. Thus, browser 209 substitutes 3D data representation 233 (via link 233L) for 2D data representation 213 when displaying the retailer's web page.

Figure 3B:
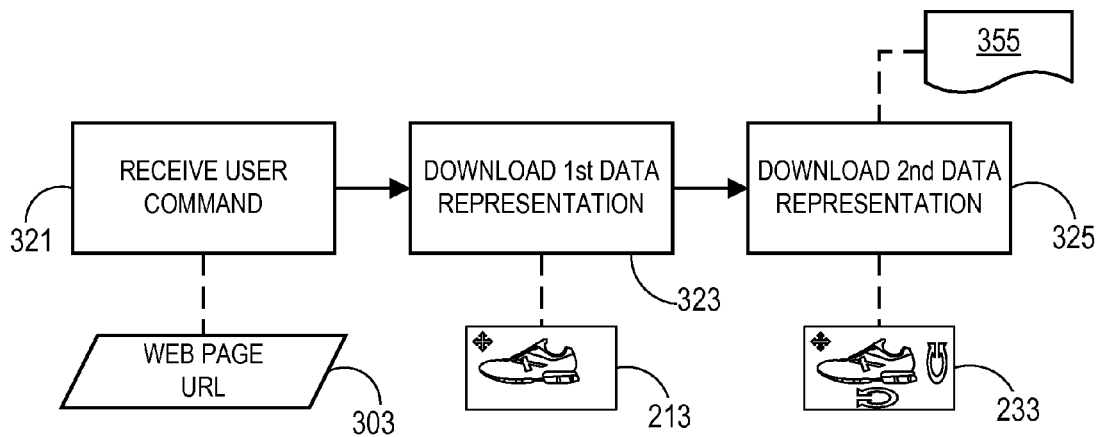
FIG. 3B is a flowchart of a method according to an embodiment of the present invention for selectively obtaining multiple data representations of a digital graphical object having different numbers of degrees of freedom.

FIG. 3B is a flowchart of a method according to an embodiment of the present invention for selectively obtaining multiple data representations of a digital graphical object having different numbers of degrees of freedom. In a step 321 a user command is received, which identifies web page 301. In a related embodiment, web page 301 is identified by web page URL 303 of web page 301 (FIG. 3A). In a step 323, a first data representation 213 is downloaded from web page 301. In a step 325, a second data representation 233 is downloaded from web page 301. In a related embodiment, step 323 and step 325 are performed in either order. In another related embodiment, steps 323 and 325 are performed simultaneously. In further related embodiments, multiple web page URL's are obtained, and data representations 213 and 233 are downloaded from multiple web pages or multiple servers, such as via a link 233L provided by registry database 355, as described above. According to these embodiments, first data representation 213 and second data representation 233 may be provided by different web sites, different web pages, and/or via different servers. In particular, the second data representation may be provided by a web site, web page and/or server that does not host a web site, web page, or server that hosts the first data representation.

Figure 3C:
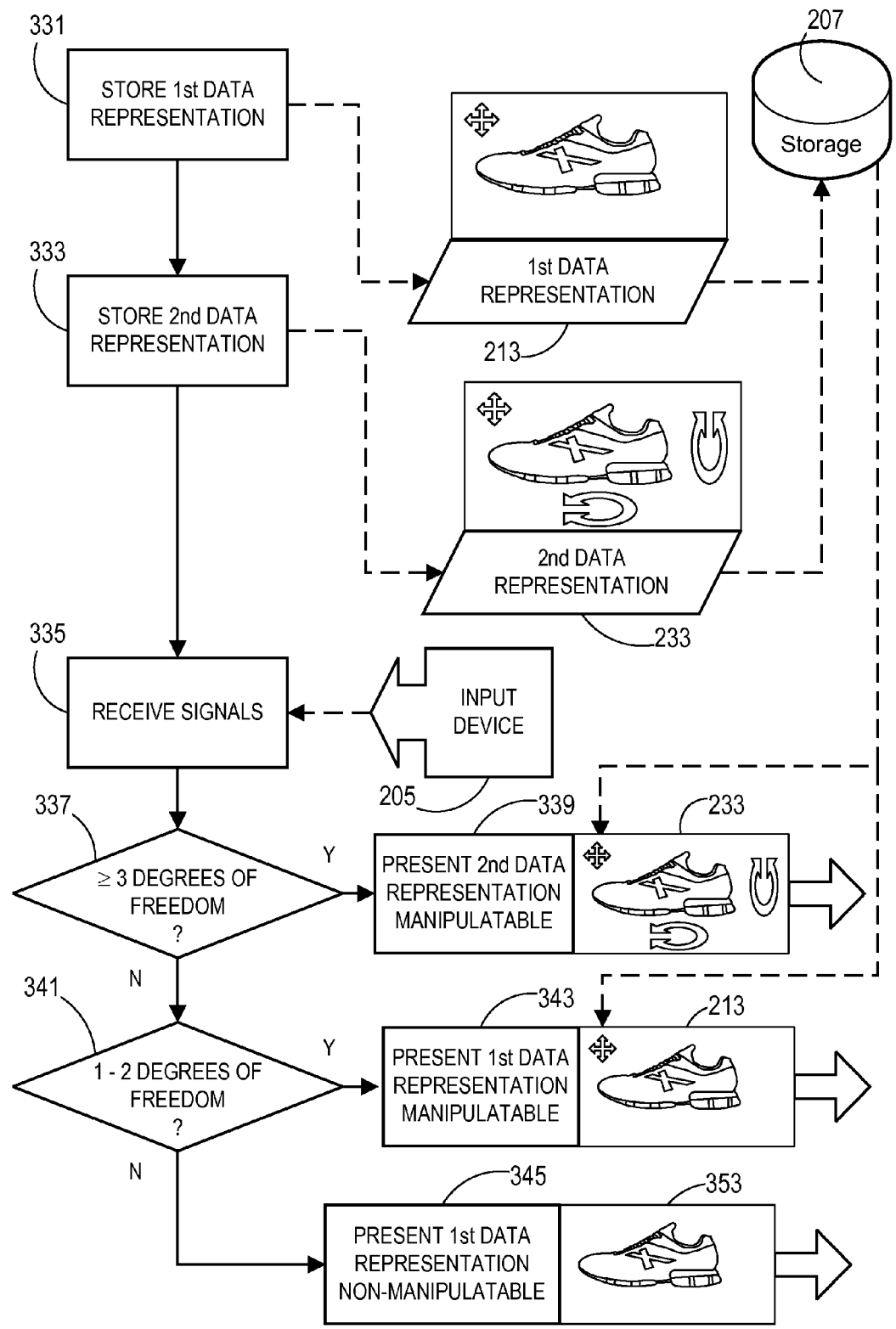
FIG. 3C is a flowchart of a method according to an embodiment of the present invention for responsively managing and presenting, to a user, a digital graphical object with either at most two degrees of freedom, or at least three degrees of freedom.

FIG. 3C is a flowchart of a method according to an embodiment of the present invention for responsively managing and presenting, to a user, a digital graphical object with either at most two degrees of freedom, or at least three degrees of freedom. In a step 331, first data representation 213 is stored in storage 207, and in a step 333, second data representation 233 is stored in storage 207. In a related embodiment, step 331 and step 333 are performed in either order. In another related embodiment, steps 331 and 333 are performed simultaneously.

In a step 335 signals are received from input device 205. In an embodiment of the invention, the signals are control signals from input device 205, wherein the nature of the control signals themselves characterize input device 205 in terms of the number of degrees of freedom provided by input device 205. In another embodiment, the signals are a response to a query command sent to input device 205, wherein the response identifies or characterizes input device 205 in terms of the number of degrees of freedom provided by input device 205. At a decision point 337, if at least three degrees of freedom are detected to be controlled by input device 205, then in a step 339 graphical digital object 133 (FIG. 2) is presented to the user in manipulatable form according to second data representation 233. In a non-limiting example of this case, the user can manipulate graphical digital object 133 via manipulations to second data representation 233 in three or more degrees of freedom to control the display of digital graphical object 133 (FIG. 2) translationally in x and y position as well as rotationally in roll and yaw.

If, however, decision point 337 detects that no more than two degrees of freedom are controlled by input device 205, then at a decision point 341 if either one or two degrees of freedom are detected to be controlled by input device 205, then in a step 343 graphical digital object 113 (FIG. 2) is presented to the user in manipulatable form according to first data representation 213. In a non-limiting example of this case, the user can manipulate graphical digital object 113 via manipulations to first data representation 213 in one or two degrees of freedom to control the display of digital graphical object 113 (FIG. 2) translationally in x position (one degree of freedom), or in both x and y position (two degrees of freedom).

If, however, decision point 341 detects that no degrees of freedom are controlled by input device 205, then in a step 345 first data representation 213 is presented to the user in non-manipulatable form. That is, in this case a digital graphical object 353 is presented to the user in a form that is static, without any provision for manipulation. In a related embodiment, digital graphical object 353 is derived from first data representation 213 as a static image, such as a still picture or representation thereof. In another related embodiment, digital graphical object 353 is a motion picture, a video, or an animation effected by a series of static images. In a related embodiment, the method illustrated in FIG. 3C is performed by a processor, such as processor 201 (FIG. 2).

Another embodiment of the present invention provides a computer product including a tangible non-transitory storage medium containing a set of executable commands for performing any of the above methods on a computer, and wherein the tangible computer-readable data storage medium includes, but is not limited to: computer media such as magnetic media and optical media; computer memory; semiconductor memory storage; flash memory storage; data storage devices and hardware components; and the tangible non-transitory storage devices of a remote computer or communications network; such that when the executable commands of the computer product are executed by the computer, the computer product causes the computer to perform the method.

While the invention has been described with respect to a limited number of embodiments, it will be appreciated that many variations, modifications and other applications of the invention may be made.

The invention claimed is:

1. A method for manipulating a digital graphical object on a display device of a computer, the method comprising:
storing, in a storage device of the computer, a first data representation of the digital graphical object, the first data representation being visually rotationally manipulatable in no more than one rotational degree of freedom;
storing, in a storage device of the computer, a second data representation of the digital graphical object, the second data representation being visually rotationally manipulatable in at least two rotational degrees of freedom;
detecting, by a processor of the computer, at least one input device connected to the computer; and
if the at least one input device includes an input device for simultaneously controlling at least two rotational degrees of freedom, then presenting the digital graphical object on the display device according to the second data representation, visually rotationally manipulatable in the at least two rotational degrees of freedom in accordance with control signals received from the at least one input device; and
if the at least one input device includes no input device for simultaneously controlling at least two rotational degrees of freedom, then presenting the digital graphical object on the display device according to the first data representation, visually rotationally manipulatable in no more than one rotational degrees of freedom in accordance with control signals received from the at least one input device.

2. The method of claim 1, wherein the at least one input device is responsive to physical rotation by a user, such that when the user physically rotates the at least one input device, the at least one input device sends control signals corresponding to the physical rotation.

3. The method of claim 1, wherein the first data representation is downloaded from a first server and wherein the second data representation is downloaded from a second server different from the first server.

4. The method of claim 1, wherein the first data representation represents a still picture or a motion picture.

5. The method of claim 1, wherein the second data representation represents a three-dimensional object that can be rotationally manipulated in at least two rotational degrees of freedom via the input device.

6. The method of claim 5, wherein the input device is a smartphone.

7. The method of claim 1, executed by a browser running on a processor of the computer, the method further comprising, prior to the storing of the first data representation and the second data representation:
receiving a command from a user, the command identifying a web page;
downloading from the web page the first data representation of the digital graphical object; and
downloading the second data representation of the digital graphical object.

8. The method of claim 7, wherein the second data representation is downloaded from one of:
the web page;
a service web page which is different from the web page;
a website that does not host the web page; or
a server that does not host the web page.

9. A method of manipulating, by a browser, a digital graphical object on a display device of a computer, the method comprising:
receiving a command from a user, the command identifying a web page;
downloading from the web page a first data representation of the digital graphical object, the first data representation being visually rotationally manipulatable in no more than one rotational degree of freedom;
downloading a second data representation of the digital graphical object, the second data representation being visually rotationally manipulatable in at least two rotational degrees of freedom;
detecting, by a processor of the computer, at least one input device connected to the computer; and
if the at least one input device includes an input device for simultaneously controlling at least two rotational degrees of freedom, then presenting the digital graphical object on the display device according to the second data representation, visually rotationally manipulatable in the at least two rotational degrees of freedom in accordance with control signals received from the at least one input device; and
if the at least one input device includes no input device for simultaneously controlling at least two rotational degrees of freedom, then presenting the digital graphical object on the display device according to the first data representation, visually rotationally manipulatable in no more than one rotational degrees of freedom in accordance with control signals received from the at least one input device.

10. The method of claim 9, wherein the at least one input device is responsive to physical rotation by the user, such that when the user physically rotates the at least one input device, the at least one input device sends control signals corresponding to the physical rotation.

11. The method of claim 9, wherein the second data representation is downloaded from one of:
the web page;
a service web page which is different from the web page;
a website that does not host the web page; or
a server that does not host the web page.

12. The method of claim 11, wherein the second data representation represents a three-dimensional object that can be rotationally manipulated in at least two rotational degrees of freedom via the input device.

13. The method of claim 12, wherein the input device is a smartphone.

14. The method of claim 9, wherein the first representation represents a still picture or a motion picture.

15. A computer system for presenting a digital graphical object to a user, the system comprising:
a storage device, for storing:
a first data representation of the digital graphical object, the first data representation being visually rotationally manipulatable in no more than one rotational degree of freedom; and
a second data representation of the digital graphical object, the second data representation being visually rotationally manipulatable in at least two rotational degrees of freedom;

a display device, for presenting the digital graphical object to the user; and a processor, for:

detecting at least one input device connected to the computer; and if the at least one input device includes an input device for simultaneously controlling at least two rotational degrees of freedom, then presenting the digital graphical object on the display device according to the second data representation, visually rotationally manipulatable in the at least two rotational degrees of freedom in accordance with control signals received from the at least one input device; and if the at least one input device includes no input device for simultaneously controlling at least two rotational degrees of freedom, then presenting the digital graphical object on the display device according to the first data representation, visually rotationally manipulatable in no more than one rotational degrees of freedom in accordance with control signals received from the at least one input device.

16. The computer system of claim 15, wherein the at least one input device is responsive to physical rotation by the user, such that when the user physically rotates the at least one input device, the at least one input device sends control signals corresponding to the physical rotation.

17. The computer system of claim 15, wherein the processor downloads the first data representation from a first server and wherein processor downloads the second data representation from a second server different from the first server.

18. The computer system of claim 15, wherein the input device is a smartphone.

19. A computer product for manipulating a digital graphical object on a display device of a computer, the product comprising a tangible non-transitory storage medium containing a set of executable commands, such that when the executable commands of the computer product are executed by the computer, the computer product causes a processor of the computer to perform:

storing, in a storage device of the computer, a first data representation of the digital graphical object, the first data representation being visually rotationally manipulatable in no more than one rotational degree of freedom;

storing, in a storage device of the computer, a second data representation of the digital graphical object, the second data representation being visually rotationally manipulatable in at least two rotational degrees of freedom;

detecting, by the processor, at least one input device connected to the computer; and if the at least one input device includes an input device for simultaneously controlling at least two rotational degrees of freedom, then presenting the digital graphical object on the display device according to the second data representation, visually rotationally manipulatable in the at least two rotational degrees of freedom in accordance with control signals received from the at least one input device; and if the at least one input device includes no input device for simultaneously controlling at least two rotational degrees of freedom, then presenting the digital graphical object on the display device according to the first data representation, visually rotationally manipulatable in no more than one rotational degrees of freedom in accordance with control signals received from the at least one input device.

20. The computer product of claim 19, wherein the at least one input device is responsive to physical rotation by a user, such that when the user physically rotates the at least one input device, the at least one input device sends control signals corresponding to the physical rotation.

21. The computer product of claim 19, further comprising executable commands that cause a processor of the computer to perform: downloading the first data representation from a first server and downloading the second data representation from a second server different from the first server.

* * * * *